United States Patent [19]

Chu

[11] Patent Number: 4,810,551
[45] Date of Patent: Mar. 7, 1989

[54] BAMBOO BOARD

[76] Inventor: Alan C. Chu, 3901 Doubleday Dr., Kalamazoo County, Mich. 49083

[21] Appl. No.: 939,477

[22] Filed: Dec. 8, 1986

Related U.S. Application Data

[63] Continuation-in-part of Ser. No. 809,432, Dec. 16, 1985, abandoned.

[51] Int. Cl.[4] .......................... B32B 5/12; B32B 21/14
[52] U.S. Cl. ..................................... 428/106; 144/333; 428/537.1
[58] Field of Search ................ 144/332, 333; 428/106, 428/537.1

[56] References Cited

U.S. PATENT DOCUMENTS

| | | | |
|---|---|---|---|
| 1,026,861 | 5/1912 | Haskell | 428/537.1 X |
| 1,074,801 | 10/1913 | Krebs | 428/537.1 X |
| 1,949,692 | 3/1934 | Pavesi | 428/703 X |
| 2,256,946 | 9/1941 | Hill | 428/537.1 X |
| 3,690,979 | 9/1972 | Jarvi | 428/537.1 X |
| 3,936,551 | 2/1976 | Elmendorf et al. | 428/50 |
| 3,970,497 | 7/1976 | Glover et al. | 428/106 X |
| 4,184,404 | 1/1980 | Tomioka | 428/537.1 X |
| 4,231,834 | 11/1980 | Gonzalez | 428/17 X |
| 4,255,477 | 3/1981 | Holman | 428/106 |
| 4,405,002 | 9/1983 | Catalano | 428/537.1 X |
| 4,471,012 | 9/1984 | Maxwell | 428/47 X |
| 4,490,517 | 12/1984 | Fuzesi et al. | 428/541 X |
| 4,519,435 | 5/1985 | Stier | 428/126 X |
| 4,528,117 | 7/1985 | Scholl et al. | 428/326 X |
| 4,546,039 | 10/1985 | Horacek et al. | 428/537.1 X |
| 4,690,874 | 9/1987 | Saver et al. | 428/537.1 |

FOREIGN PATENT DOCUMENTS

| | | | |
|---|---|---|---|
| 235534 | 9/1964 | Austria | 428/119 |
| 55-164141 | 12/1980 | Japan | 428/537.1 |
| 17250 | 2/1981 | Japan | 428/119 |

Primary Examiner—Henry E. Epstein

[57] ABSTRACT

A bamboo board comprising a number of longitudinal layers (4) and a number of lateral layers (5). The longitudinal layer is made by longitudinal bamboo strips (1) bonded together with adhesives (3), and the lateral layer is made by lateral bamboo strips (2) bonded together with adhesives (3). During assembly, the longitudinal layers and lateral layers are laid over alternately, with strips of each layer at right angles to those of adjacent layers, and bonded by adhesives (3) in between to become said bamboo board.

5 Claims, 1 Drawing Sheet

U.S. Patent
Mar. 7, 1989
4,810,551
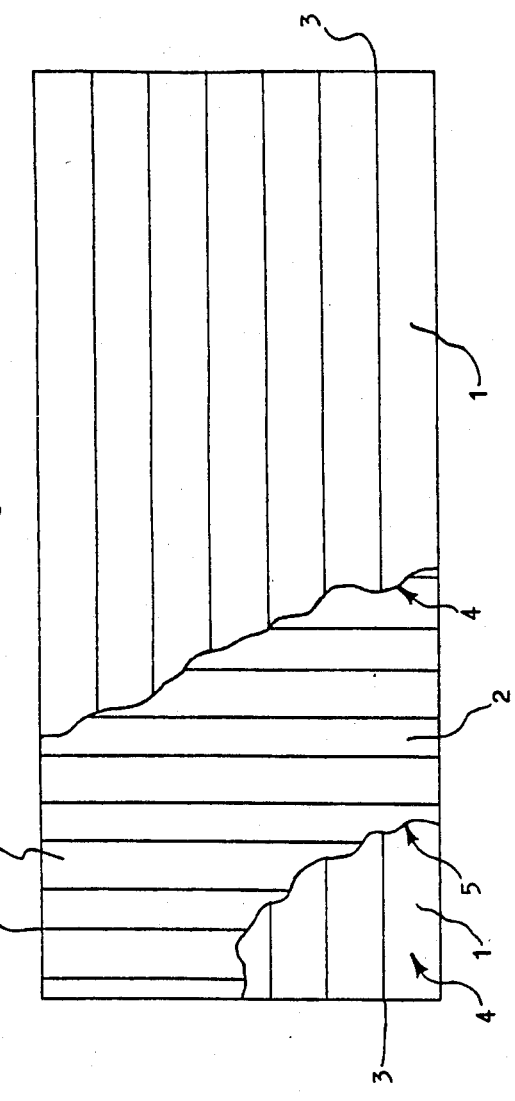
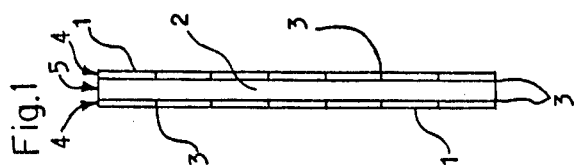
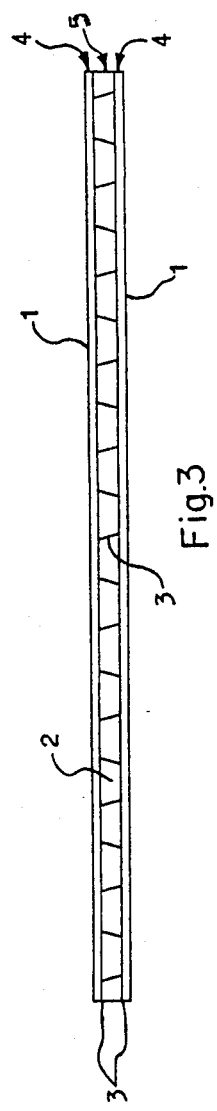

BAMBOO BOARD

This is a continuation-in-part of prior pending application Ser. No. 06/809,432 filing date 12/16/85 now abandoned.

BACKGROUND OF THE INVENTION

Most wood trees have solid tree trunks which can grow to have large diameters, so they can easily be cut and sawn into lumber boards. These boards, together with other manufactured wood boards, are used in construction and other areas. Plywood is manufactured by continuously peeling along the circumference of a wood log, thereby producing wood sheets or veneers which can be cut and assembled into a "sandwich" with glue between the sheets. Due to technical difficulties, the logs have to be abandoned when the diameter has decreased to about 4 inches.

Bamboo trees are normally not suitable for the production of lumber boards or plywoods. Since bamboo tree trunks are hollow, they cannot be made into lumber boards. In addition, bamboo tree trunks have relatively small diameters even when the trees are fully mature, and so the standard process of manufacturing plywood cannot be applied to bamboo logs with practicality. As a result, no bamboo boards have been commercially available, despite the fact that there are certain advantages in the use of bamboos.

Bamboo fibers are stiffer and stronger than most wood fibers, so a successfully produced bamboo board should have a strength to weight ratio greater than that of boards made from most woods. More importantly, bamboo trees grow to full maturity in only 2 to 6 years while wood trees, even the fastest growing ones, would take 15 to 30 years. This very favorable growth rate of bamboo trees would present a significant solution to the possible shortage of available lumber caused by both the increasing demand for lumber and the gradual depletion of sizeable wood trees, a shortage which can be alleviated through the successful use of bamboos.

Since bamboo trees and wood trees are not of the same botanical species, the methods of cultivation, harvesting and curing of bamboo trees differ widely from that of wood trees; so are the characters of their fiber, their color, and their grain textures. In addition, the manufacturing methods and physical or chemical treatments of bamboos also differ greatly from that of other woods, therefore all manufactured wood boards such as plywoods, laminate woods, wafer woods, and particle boards should not be used to compare with this invention.

SUMMARY OF THE PRESENT INVENTION

In order to overcome the above difficulties and to increase the usage of bamboo, it is the objective of this invention to produce a bamboo board by placing layers of adhesively bonded bamboo strips laid over each other, with strips of each layer at right angles to those of adjacent layers, and bonding them with adhesives in between, thus resulting in a product which can replace natural wood boards and manufactured wood boards in usage.

This board can be coated or covered with other kinds of materials to broaden its usages and to produce variety in its appearance.

This board can also be produced with wood strips or strips of other materials replacing bamboo strips.

DESCRIPTION OF THE DRAWING FIGURES

FIG. 1 is a side view of this invention.
FIG. 2 is a top view of this invention with partially removed layers to show details of each successive layer.
FIG. 3 is a front view of this invention.

DESCRIPTION OF THE ILLUSTRATED EMBODIMENT

This invention comprises longitudinal layers (4) made by longitudinal bamboo strips (1), lateral layers (5) made by lateral bamboo strips (2), the adhesives (3).

The longitudinal bamboo strips (1) are bamboo strips cut lengthwise uniformly from bamboo tree trunks. The cross-section of these strips can be rectangular, trapezoidal, triangular or of any other shape necessitated by the presence of the annular rings in the bamboo trunk.

The lateral bamboo strips (2) are bamboo strips obtained by the same method as the longitudinal bamboo strips, but their lengths, shapes, and sizes need not necessarily be the same.

During assembly, longitudinal bamboo strips (1) are placed side by side parallel to each other, and these strips are bonded together with adhesives (3) in between to form a longitudinal layer (4) that has uniform cross-section with flat surfaces on all sides. A lateral layer (5) is formed in the same way from lateral bamboo strips (2). The obtained longitudinal and lateral layers are then laid over alternately, with all the longitudinal bamboo strips at right angles to all the lateral bamboo strips, and the layers are bonded together with adhesives (3) in between to form the bamboo board. Since the numbers of longitudinal and lateral layers used can be varied, the bamboo board produced can have different numbers of layers and hence different thicknesses. If only the longitudinal layers are used in the assembly, or all layers are laid over with their strips in parallel position, the resulting board could be used as a bamboo beam or column.

Although the methods of manufacturing bamboo boards are different from that of wood boards, certain other methods commonly used in the wood board manufacturing industries may be modified to improve this invention.

I claim:

1. A bamboo board comprising a number of longitudinal layers and a number of lateral layers, each said layer being made by uniform bamboo strips bonded with adhesives, said longitudinal layers and said lateral layers being laid over alternately, with strips of each layer at right angles to those of adjacent layers, and bonded by adhesives in between thereby producing a rectangular board.

2. Bamboo board of claim 1, wherein said longitudinal layers or said lateral layers are laid over with their strips parallel to each other, and bonded by adhesives in between, while the cross-section of said bamboo strips is triangular, trapezoidal, or irregular in shape.

3. Bamboo board of claim 1, whose exterior surfaces are covered with other materials from the group consisting of wax, paint, formica, and wood veneers.

4. The board of claim 1, wherein said bamboo strips of a layer are replaced by wood strips or strips of other materials from the group consisting of reed, rattan, wicker, and rush containing fibers running in only one direction.

5. A method for producing a bamboo board, comprising the following steps in sequence:

(a) splitting lengthwise along the trunk of a bamboo tree to obtain uniform bamboo strips;
(b) placing said bamboo strips side by side and bonding with adhesives in between to make flat and thin rectangular longitudinal layers;
(c) placing said bamboo strips side by side and bonding with adhesives in between to make flat and thin rectangular lateral layers with the length of said longitudinal layers as its width, and the width of said longitudinal layers as its length; and
(d) laying over said longitudinal layers and said lateral layers alternately, with bamboo strips of each said layer at right angles to those of adjacent layers, and bonding them with adhesives in between to form a multi-layer rectangular board.

* * * * *